United States Patent [19]
Mazzola et al.

[11] Patent Number: 5,740,171
[45] Date of Patent: Apr. 14, 1998

[54] ADDRESS TRANSLATION MECHANISM FOR A HIGH-PERFORMANCE NETWORK SWITCH

[75] Inventors: Mario Mazzola, San Jose; Tom Edsall, Mountain View; Luca Cafiero, Palo Alto, all of Calif.

[73] Assignee: Cisco Systems, Inc., Palo Alto, Calif.

[21] Appl. No.: 621,718

[22] Filed: Mar. 28, 1996

[51] Int. Cl.$^6$ .................................................. H04L 12/66
[52] U.S. Cl. .......................................... 370/392; 370/401
[58] Field of Search .................................. 370/392, 393, 370/395, 396, 400, 401, 466, 474

[56] References Cited

U.S. PATENT DOCUMENTS

| | | | |
|---|---|---|---|
| 5,208,811 | 5/1993 | Kashio et al. ................... | 370/401 |
| 5,394,402 | 2/1995 | Ross .................................. | 370/94.1 |
| 5,485,455 | 1/1996 | Dobbins et al. .................. | 370/255 |
| 5,633,869 | 5/1997 | Burnett et al. .................... | 370/396 |
| 5,636,371 | 6/1997 | Yu ...................................... | 395/500 |

*Primary Examiner*—Douglas W. Olms
*Assistant Examiner*—Min Jung
*Attorney, Agent, or Firm*—Cesari and McKenna, LLP

[57] ABSTRACT

An address translation mechanism quickly and efficiently renders forwarding decisions for data flames transported among ports of a high-performance switch on the basis of, inter alia, virtual local area network (VLAN) associations among the ports. The translation mechanism comprises a plurality of forwarding tables, each of which contains entries having unique index values that translate to selection signals for ports destined to received the data frames. Each port is associated with a unique index value and a VLAN identifier to facilitate multicast data transfers within the switch at accelerated speeds and addressing capabilities.

20 Claims, 6 Drawing Sheets

ADDRESS TRANSLATION MECHANISM FOR A HIGH-PERFORMANCE NETWORK SWITCH

CROSS-REFERENCE TO RELATED APPLICATIONS

This invention is related to the following copending U.S. Patent Applications:

U.S. patent application Ser. No. (112025-0013) titled, ARCHITECTURE FOR AN EXPANDABLE TRANSACTION-BASED SWITCHING BUS;

U.S. patent application Ser. No. (112025-0015) titled, INTERSWITCH LINK MECHANISM FOR CONNECTING HIGH-PERFORMANCE NETWORK SWITCHES; and U.S. patent application Ser. No. (112025-0016) titled, COLOR BLOCKING LOGIC MECHANISM FOR A HIGH-PERFORMANCE NETWORK SWITCH, each of which was filed on even date herewith and assigned to the assignee of the present invention.

FIELD OF THE INVENTION

This invention relates generally to network switches and, more specifically, to an address translation mechanism for a high-performance network switch.

BACKGROUND OF THE INVENTION

A network switch of a data communications network provides a "switching" function for transferring information, such as data frames, among entities of the network. Typically, the switch is a computer comprising a collection of components (e.g., cards) interconnected by a backplane of wires. Each card may include a limited number of ports that couple the switch to the other network entities over various types of media, such as Ethernet, FDDI or token ting connections. A network entity may consist of any device that "sources" (i.e., transmits) or "sinks" (i.e., receives) data frames over such media.

The switching function provided by the switch typically comprises receiving data at a source port from a network entity, transferring the data over the backplane to a destination port and, thereafter, transmitting that data over a medium to another entity of the network. In many cases, the destination of a data frame may be more than one, but less than all of the ports of the switch; this type of multicast data transfer is typically employed to segregate communication between groups of entities on a network. However, multicast transfers generally degrade the performance of a switch because of the software involvement typically needed to effect forwarding decisions for the frame based on port membership in a group. Performance degradation may be further exasperated in a situation where it is desired to connect a single network entity to two different ports (i.e., "dual-homed" connection) with the purpose of integrating data communication between that network entity and various segregated entity groups.

In order to provide efficient network isolation, separate switches are typically used. For example, a first switch may be used to interconnect a group of "red" entities and a second switch for interconnecting a group of "blue" entities. A bridge or router may then be employed to couple the two switches while providing, among other things, "firewalling" (i.e., segregation) with respect to certain communication between the entities of the different color groups.

A resource problem arises with this type of configuration when nearly all of the limited number of ports on one of the switches are used. For example, assume all but one of the ports of the first switch are utilized, but there are three available ports on the second switch. If it is desired to add two entities to the red group, another switch is needed because there is only one available port on the first switch. The resulting topology would comprise two switches connected together on the "red" side of the router with one switch coupled to the "blue" side. Resources are effectively squandered because, collectively, there are sufficient ports among the switches to accommodate the new red entities.

A solution to this problem may be to provide an arrangement that is capable of associating any port of a switch with any particular segregated network group; an example of a similar arrangement is disclosed in U.S. Pat. No. 5,394,402, issued on Feb. 28, 1995 to Floyd E. Ross. According to this patent, any number of physical ports may be associated with any number of groups within a network hub using a virtual local area network (VLAN) arrangement that virtually associates the port with a particular VLAN designation.

Specifically, Ross discloses a hub for a segmented virtual local area network (VLAN) with shared media access that associates VLAN designations with at least one internal port and further associates those VLAN designations with messages transmitted from any of the ports to which the VLAN designation has been assigned. The VLAN designation for each internal port is stored in a memory portion of the hub such that, every time a message is received by the hub on an internal port, the VLAN designation of that port is associated with the message. Association is accomplished by a flow processing element which looks up the VLAN designation in a respective memory portion based on the number of the internal port where the message originated. As noted by Ross, this type of operation is performed by a typical content addressable memory (CAM).

In a CAM circuit, data is accessed in accordance with the properties of its own value, i.e., its content, rather than by an address; this structure facilitates a fast search through all entries of the memory to find the appropriate data. However, CAM circuits are generally expensive and do not have the bandwidth characteristics needed to achieve the data rates mandated by a high-performance, bus-based network switch. A high-performance switching architecture of this type supports a significantly large address space for transferring data flames at an effective data rate of, e.g., 1M frames/sec.

Ross states that other memory mechanisms may used instead of the typical CAM technique; however, the configurations of such mechanisms, especially those needed to support high data rate transfers, are not disclosed in that patent. A known "look-up" memory technique that may satisfy the bandwidth requirements of a high performance switch is a conventional memory arrangement configured to accept a destination address as an input and deliver a port number as an output. However, an extremely large memory store unit is required (e.g., on the order to terabytes) to support a large memory address space; this is clearly impractical to implement cost-effectively.

Therefore, it is among the objects of the present invention to provide a mechanism that supports multicast data transfers among ports of a high-performance network switch without degrading the performance of the switch.

Another object of the invention is to provide a mechanism for efficiently implementing "dual-horned" multicast applications in a network switch.

Yet another object of the present invention is to provide a mechanism that efficiently implements "port-based" VLAN association operations within a high-performance network switch.

SUMMARY OF THE INVENTION

Briefly, the invention relates to an address translation mechanism that quickly and efficiently renders forwarding decisions for data frames transported among ports of a high-performance switch on the basis of, inter alia, virtual local area network (VLAN) associations among the ports. The translation mechanism comprises a plurality of forwarding tables, each of which contains entries having unique index values that translate to selection signals for ports destined to received the data frames. According to the invention, each port is associated with a unique index value and a VLAN ("color") identifier to facilitate multicast data transfers within the switch at accelerated speeds and addressing capabilities.

In the illustrative embodiment, a media access control (MAC) address is combined with the color identifier to produce a base line numerical quantity for searching the forwarding tables. Each table entry is directly accessed, however, by a key comprising a hash transformation of this MAC/color quantity. A comparison circuit arrangement of the mechanism is also provided to validate the forwarding table entry mapped by the hashed MAC/color quantity. That is, the circuit arrangement compares the base line numerical quantity to a MAC/color value stored in the mapped entry to ensure that the entry contains the correct index value.

Operationally, if the compared items match, the index value stored in the table is provided to a target logic circuit for translation to a signal that selects a port or group of ports for receiving the data frame. If the items do not match, the color identifier is passed to the target logic circuit with the result that all ports having that color identifier receive the frame in accordance with a multicast transfer.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF ILLUSTRATIVE EMBODIMENT

Figure 1:
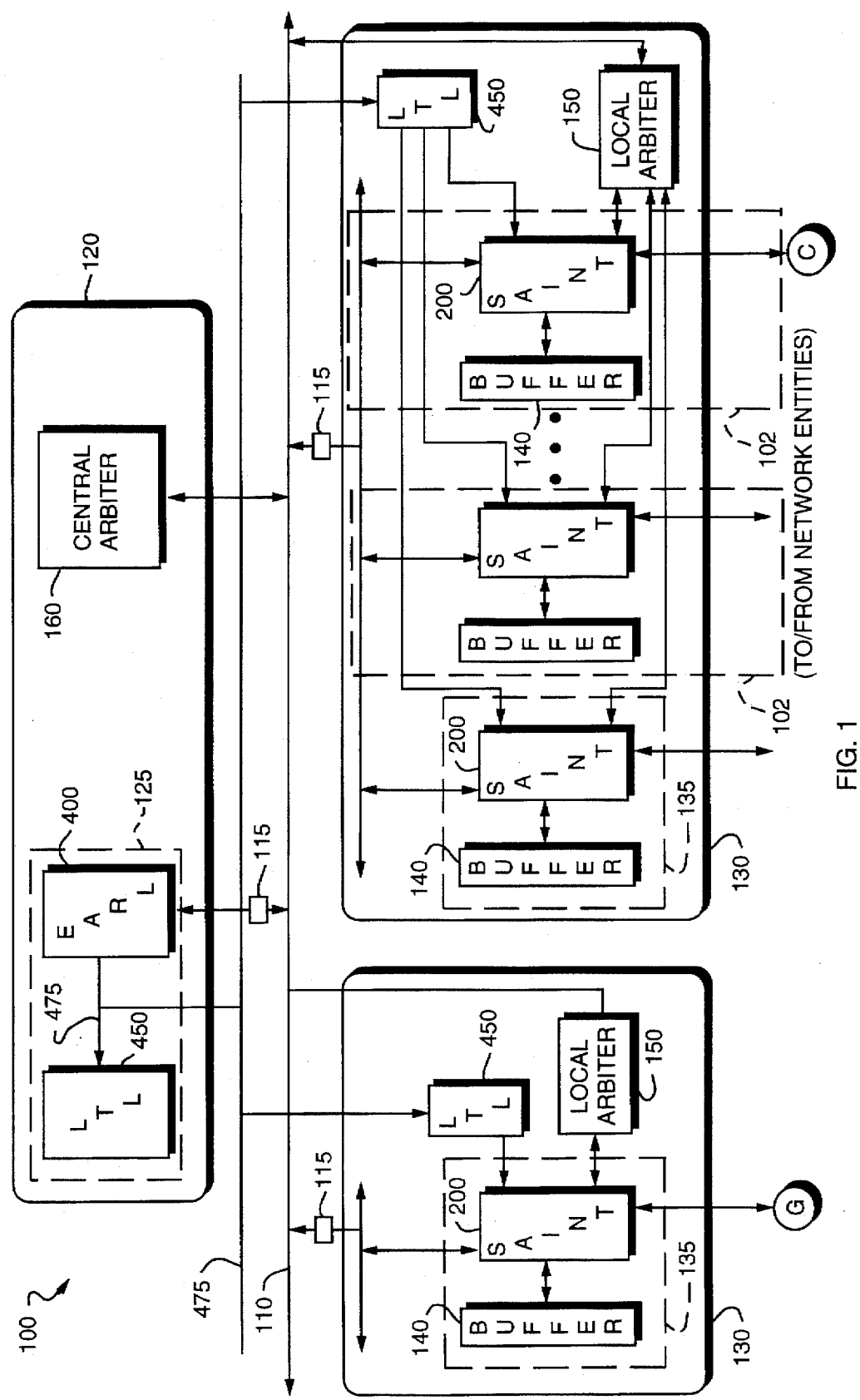
FIG. 1 is a schematic block diagram of a network switch comprising a high-performance switching bus for interconnecting ports that may be advantageously used with the present invention.

FIG. 1 is a schematic block diagram of a network switch 100 comprising a high-performance switching bus 110 for interconnecting ports 102 that couple the switch to network entities of a data communications network. The ports may be implemented on various cards of the switch, including a supervisor card 120 and a plurality of line cards 130. Each line card may have as many as 64 ports situated thereon, while the supervisor card may contain no ports. Communication among the ports/cards occurs synchronously over the switching bus 110 using periodic bus cycles. The switching bus is preferably a 48-bit bus having a bus cycle of 40 nsecs (25 MHz) and an effective data rate of 1.2 Gb/s.

The architecture of the switching bus is preferably implemented as forwarding engine circuitry 125 and port interface circuitry 135 that cooperate to efficiently transmit data to, and receive data from, the switching bus 110. The forwarding engine 125 is located on the supervisor card 120 and comprises an encoded address recognition logic (EARL) circuit 400 coupled to a local target logic (LTL) circuit 450 over a result bus 475. Functionally, the EARL 400 executes all forwarding decisions for the switch 100, while the LTL 450 implements those forwarding decisions by selecting ports as destinations for receiving data frames transferred over the switching bus 110. As can be seen in FIG. 1, the LTL may be distributed among the cards of the switch via the result bus 475.

Each port 102 of the switch is controlled by port interface circuitry 135 comprising a synchronous advanced interface network termination (SAINT) circuit 200 coupled to a frame buffer 140, which is preferably a first-in, first out (FIFO) memory. The SAINT 200 provides media access control (MAC) and direct memory access (DMA) capabilities for the switch 100. Specifically, the DMA capability provides buffer management of the frame buffer 140 and an interface to the switching bus 110, while the MAC capability allows attachment of the switch 100 to a network entity. The network entity may comprise a processor or similar circuit that interfaces with network media, such as Ethernet, FDDI or token ring connections.

In the illustrative embodiment, a buffer circuit 115 connects each card to the switching bus 110. This circuit 115 is located on the switching bus 110 and provides a single clock (i.e., 40 nsec) delay between the bus and each port 102 on the card. Such clock cycle delay maintains proper loading on the backplane so that data transmitted from the ports can be properly driven onto the bus.

Efficiency of data transfer within the switch is further realized in accordance with a 2-tier arbitration policy that ensures adequate port access to the switching bus 110. Arbitration Consists of interaction between a central arbiter 160 and a local arbiter 150 contained on each card of the switch 100. The central arbiter is located on the supervisor card 120 and can preferably support as many as thirteen line cards, while each local arbiter can support up to twenty-four ports. An example of such a 2-tier arbitration policy is provided in copending and commonly assigned U.S. Patent Application titled Architecture for an Expandable Transaction-Based Switching Bus, filed on even date herewith, which application is incorporated by reference as though fully set forth herein.

Figure 2:
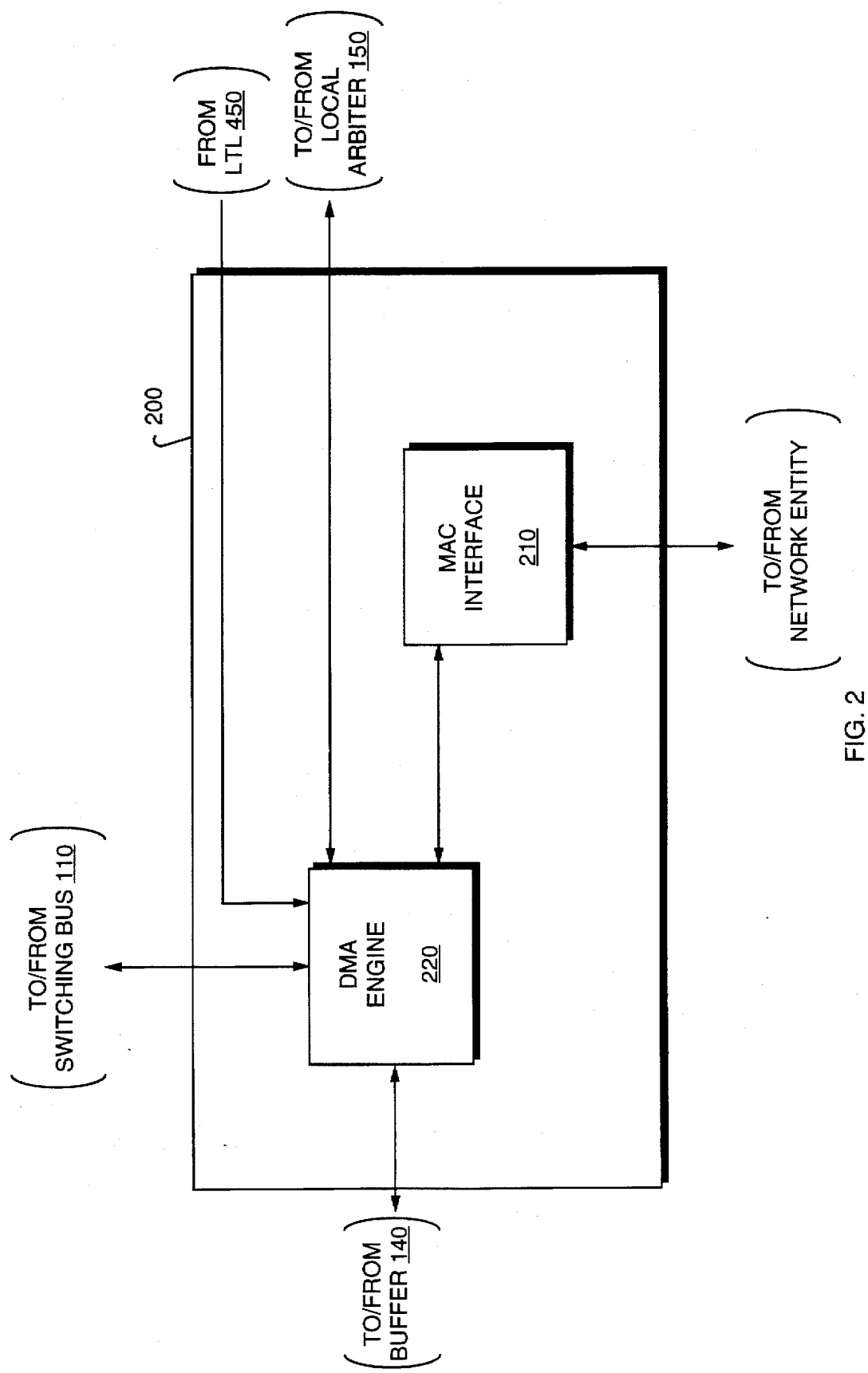
FIG. 2 is a schematic block diagram of a port interface circuit for controlling transfer of data frames associated with each port of the switch.

FIG. 2 is a schematic block diagram of the port interface circuitry 135 and, in particular, the SAINT circuit 200. This circuit is primarily responsible for (i) receiving data frames from the network and passing them to the switching bus, and (ii) receiving frames from the switching bus and passing them to the network. In order to efficiently discharge these responsibilities, the SAINT is configured to transmit and receive frame data at "wire" speed (e.g., 10 to 100 Mb/s) over the network independent of frame size, while simultaneously sourcing data to or sinking data from the switching bus 110.

The SAINT 200 comprises a MAC interface circuit 210 coupled to a DMA engine 220. Specifically, the MAC interface 210 provides an IEEE 802.3 MAC service layer for moving the frames to and from the network. The DMA engine 220, on the other hand, moves frames between the frame buffer 140 and the MAC interface 210, and between the buffer 140 and switching bus 110. The DMA engine also modifies each frame by appending header information to it prior to arbitrating for access to the switching bus.

Figure 3:
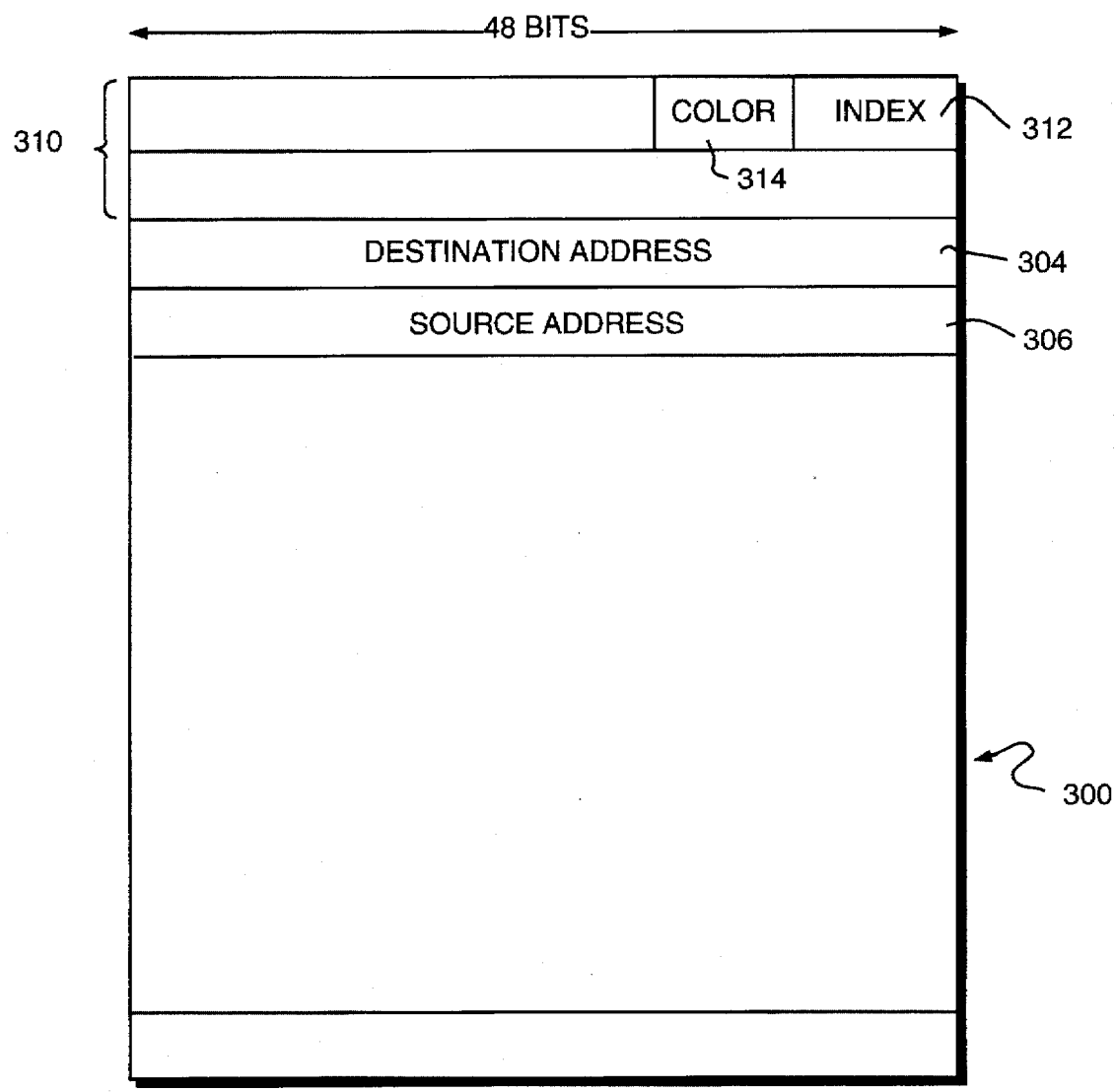
FIG. 3 is a block diagram illustrating the format of a data frame modified by the port interface circuit of FIG. 2.

FIG. 3 illustrates the format of a modified data frame 300. When received at the port, the frame contains a 48-bit destination address in field 304 that identifies the destination network address of the frame and a 48-bit source address in field 306 identifying the source network address of the frame; the DMA engine 220 of SAINT 200 then appends two 48-bit headers 310 to the frame 300. Of interest to the present invention are a unique index value and a virtual local area network (VLAN) "color" identifier that are loaded in to a 10-bit index field 312 and a 10-bit color field 314, respectively, of the frame 300 by the engine. As described herein, these values represent the source index of the port transferring the frame over the switching bus 110 and the VLAN association of the port.

Referring again to FIGS. 1 and 2, upon acquiring access to the bus, the DMA engine 220 drives its data frame through the connecting buffer circuit and on to the switching bus 110. Each card coupled to the switching bus accepts the frame and its port interface circuitry begins storing it in the respective frame buffer 140 independent of the actual destination of the frame. All of the wires of the switching bus 110 are, used for transferring the contents of the frame so that 48-bit s of data are driven onto the bus at each 40 nsec clock cycle; this continues until the entire contents of the frame are transmitted over the bus and loaded into the buffer of each port interface by the DMA engine.

Figure 4:
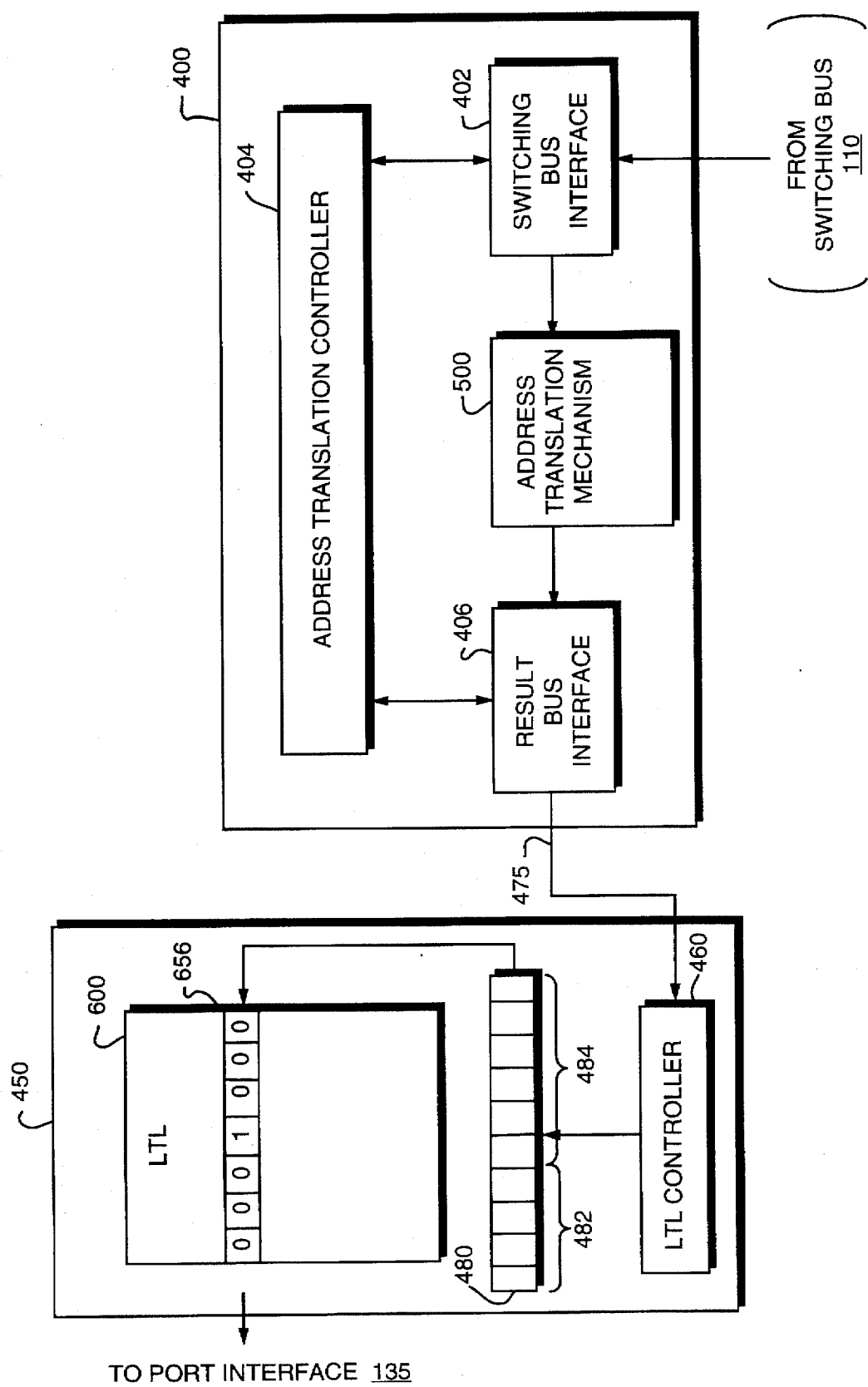
FIG. 4 is a schematic block diagram of a forwarding engine circuit that determines the destination of data frames transferred over the switching bus.

At the supervisor card 120, the forwarding engine circuitry 125 also accepts the frame, but only examines a portion of the header contents to determine the destination of the data. FIG. 4 is a schematic block diagram of the forwarding engine 125 and, in particular, the EARL 400 and LTL 450. The EARL performs two basic functions for the switch: first, it generates a unique index for each frame it receives over the switching bus in response to the frame's color and destination address. In order to generate this index, the EARL employs a novel address translation mechanism that essentially maps the frame's destination address and color (DA/color) to a destination port using forwarding tables; as described further herein, the tables contain, inter alia, a unique index value assigned to each port in the switch.

The second function performed by the EARL is maintenance of the forwarding tables. Initially, the tables are virtually "empty" and as frames are forwarded over the switching bus, EARL uses the information within the frames to create and update entries of the tables. Most of the information that EARL requires during operation traverses the bus in the form of frame headers.

Specifically, EARL 400 receives the frame at a switching bus interface circuit 402 which, under control of an address translation controller 404, parses the frame to extract the destination address (DA), source address (SA) and color identifier. The DA address is provided to the address translation mechanism 500 to produce a unique destination index value 480; essentially, the novel address translation mechanism maps the destination address of the frame to the unique index of a port. As noted, the contents of forwarding tables constituting the mechanism 500 are initially "empty" and as frames are transferred over the switching bus, the EARL uses the destination information contained in the frames to insert and update index entries of the tables. Upon resolving the destination of the frame, the index value is driven over the result bus 475 by a result bus interface circuit 406 where it is received by LTL 450.

The LTL 450 is preferably configured in a modular fashion that is easily expandable to include additional ports and line cards. To facilitate such expansion, portions of the LTL are distributed among the cards of the switch over the result bus 475 (see FIG. 1); thus, when a new card is added to the switch, an additional "chunk" of the LTL is also added to that card. As described further, the LTL 450 maps the index value to predetermined port select signals that select a port residing on its card as a destination of the frame.

The destination of any frame may be one or more ports located on one or more cards of the switch; therefore, to accommodate possible broadcast and multicast bus transfers, the destination address provided to the LTL is encoded in the form of a unique index 480. Each port or group of ports within switch 100 is assigned a unique index value and the predetermined port select signals mapped by the index may include broadcast and multicast port selection groups, in addition to individual ports. Ports which are not selected, i.e., enabled, stop accepting the frame and discard those portions of the frame that have been received.

In addition to this unique value, a virtual local area network (VLAN) identification is associated with each port of the switch to facilitate segregating of communication among network entities coupled to the ports of the switch. An example of an arrangement suitable for use with the present invention for virtually associating any number of physical ports with any number of entity groups is disclosed in U.S. Pat. No. 5,394,402, issued on Feb. 28, 1995 to Floyd E. Ross and titled Hub for Segmented Virtual Local Area Network with Shared Media Access, which patent is incorporated by reference as though fully set forth herein. Accordingly, each port has associated therewith a VLAN identification ("color") and a unique index.

The index 480 is preferably a 10-bit value comprising a 4-bit slot number field 482 and a 6-bit port number field 484. The 4-bit slot number field 482 allows addressing of sixteen (16) unique slots in the switch, whereas the 6-bit port number field 484 can address sixty-four (64) ports for each particular slot. Collectively, these fields provide a unique 10-bit index for each of one thousand (1000) ports of switch 100; however, it will be understood to those skilled in the art that other index field configurations (e.g., a 16-bit index) capable of addressing additional ports are contemplated by the principles of the invention.

In the illustrative embodiment, the slot number may be "hardwired" into the backplane so that it is automatically assigned when a card is plugged into a connector of the switch. A control processor (not shown) contained on each card may further configure each port interface circuit with the unique index number. Generally, the processor sequentially assigns port numbers to the interface circuits which, when concatenated with the hardwired slot number, comprise the unique index. For example, a port interface circuit configured to control the 4th port on a line card plugged in to the second slot of the backplane may have a unique index number of 0010000100 (hereinafter "24").

An LTL controller 460 of the LTL 450 receives the index from the result bus 475 and uses it to address a location of a store unit 600. The store unit contains a series of binary-coded values corresponding to specific ports of the switch;

these values are preferably assigned and loaded in to the LTL by the control processor at initialization of the switch. Each binary-coded value functions as a port mask; that is, each bit location of the value is associated with a particular port on a particular card. Since each port has a unique index number and each LTL contains a mask for each port on its card, the unique index on the result bus maps only to that LTL having a corresponding bit selected for the port on its card. Therefore, the length of the binary-coded value (in bits) is directly related to the number of ports on that card.

For example, the location 656 of store unit 600 contains a binary-coded port mask string in which a 0 bit state (i.e., active low) indicates that a port select should be generated for the port corresponding to that bit location. Accordingly, the port mask string at location 656 is representative of seven ports on the card associated with the LTL shown in FIG. 4 and the states of the bits comprising the string indicate that all of the ports except the fourth port (i.e., a multicast transfer) should be enabled to accept the packet.

More specifically, the binary-coded values effectively translate the unique index to a port select signal that identifies the destination of the data frame. Illustratively, port selection preferably occurs during the transfer of the frame during the current bus transaction. Indeed, because the translation process involves only the initial header portion of the frame, the port selection operation is performed prior to completion of a minimal length bus transaction. This parallel operation technique enables an effective data transfer rate of, e.g., one million frames per second over the switching bus.

Transfer of the frame may terminate in accordance with any of three different conditions: flush, normal and retry. If the forwarding engine 125 determines that the frame should not be transferred over the switching bus, it issues flush signals over the backplane. In response, to these signals, the source port circuitry 135 terminates frame transfer and flushes that frame from its buffer 140. In addition, all target ports discard the frame data accumulated up to that time.

If the forwarding engine issues a select signal to a destination port for a frame and the selected port successfully receives the complete frame, the frame bus transfer terminates normally. However, if the selected port has insufficient buffer space to accommodate the frame, it issues a retry signal to the source port circuitry. The source port then terminates the current frame transfer and retries later.

Address Translation Mechanism

Figure 5:
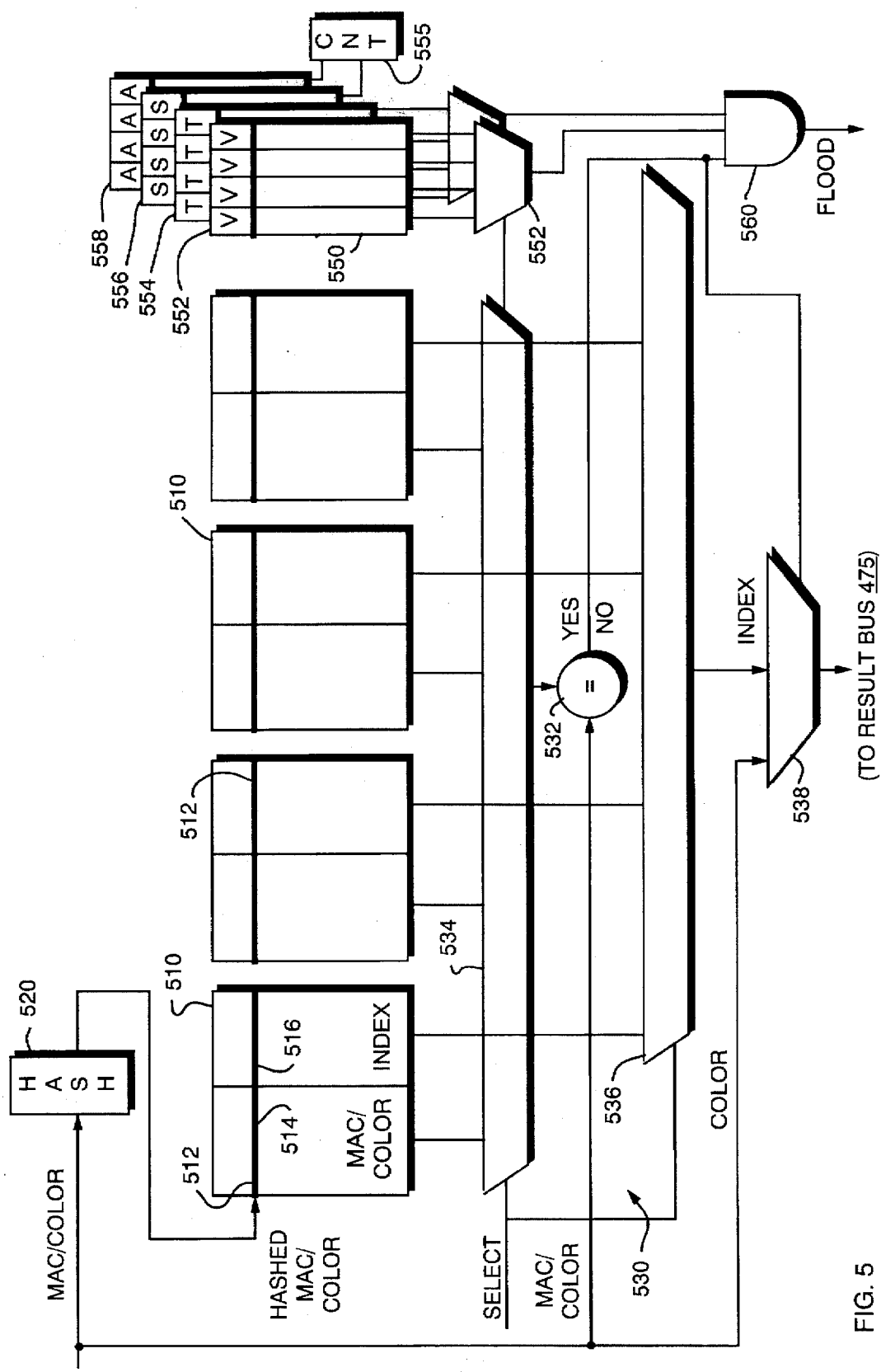
FIG. 5 is a schematic block diagram of an address translation mechanism of the forwarding engine in accordance with the invention.

FIG. 5 is a schematic block diagram of the novel address translation mechanism 500 comprising a plurality of, e.g., a random access memory (RAM) devices configured as forwarding tables 510. Each table 510 includes a plurality of table entries 512; in the illustrative embodiment, there are preferably 32K entries, each of which is generally 70-bits in length. Each entry further comprises a number of different fields, including a MAC/color field 514 and an index field 516.

As noted, when a frame appears on the bus EARL extracts certain information, including the DA/SA and color, from the frame's header. In the illustrative embodiment, either of these 48-bit MAC addresses is combined with the 10-bit color identifier to produce a base line numerical input quantity for searching the forwarding tables 510. This input is used primarily because of the ability of the switch to provide "dual-horned" workstation applications with regards to multiple ports. That is, there may be an application where a single station (having a single MAC address) is coupled to two different ports, each of which has its own associated color grouping. This capability allows the switch to support a single MAC address appearing on multiple (virtual) switches within the same physical switch.

While the index is generated during address translation, EARL also determines whether a new forwarding table entry should be created. When a port functions as a source port it normally includes its index in the frame header. At the time EARL extracts the destination address from the switching bus, it also extracts the index value for the source port along with the source address and the color of the frame. Consequently, there is sufficient information to create an entry in the table based on the frame's source address and color.

Each table is directly accessed, however, by a key comprising a hash transformation of the MAC/color quantity; this key is preferably generated by a hashing element 520 of the address translation mechanism 500. According to the invention, the combined 58-bit MAC/color quantity is hashed to produce a 15-bit key; the hashing function is preferably implemented using a conventional hash algorithm (e.g., a prime polynomial function). In the illustrative embodiment, the hashing element 520 generates a 17-bit key and the two most significant bits (MSB) are discarded. These discarded bits increase the size of the table four-fold (4×), a capacity that is reserved for future use.

Since the resulting key maps to one entry location in each table, a total of 4 individual tables collectively constitute the address translation mechanism. That is, the 58 bits of MAC/color information translate to an address space of $2^{58}$ addresses, whereas the 15-bit key translates to $2^{15}$ locations in a table; therefore, 4 tables are provided to accommodate every unique MAC/color address. In the case of dual-horned applications, the hashed MAC/color quantity generates two distinct entries in the forwarding tables for a single station.

When generating a forwarding decision for a particular frame, the MAC address is typically the destination address 304 of the frame 300, whereas when executing a learning operation, the MAC address is the source address 306. As for the latter operation, EARL uses the hashed SA/color value to create a new entry in the forwarding table. For each valid entry, EARL compares the source address/color from the table with the frame's SA/color. If no match is found, an entry is created using an available (i.e., invalid) entry of a table. If all entries of the tables are valid, one of those entries is randomly invalidated, e.g., the valid bit is cleared, to accommodate this newest entry.

As a result of the multiple-table arrangement, the hashed MAC/color key may map to an entry in each of the forwarding tables 510. Therefore, when accessing the tables, it is necessary to identify which of the four tables, if any, holds the correct index value for the MAC/color quantity of the current frame. To do this, the MAC address and color are stored in the MAC/color field 514, and the index value is stored in the index field 516, when the entry is created. After accessing a table with the hashed MAC/color quantity, the MAC address and color from that table is compared with the MAC/color of the current frame to verify whether the index is correct. If the comparison operation does not produce a match with respect to the first table, then this operation is repeated for the second, third and fourth tables (e.g., by scrolling a SELECT signal) until a match is found; otherwise, it is assumed that the MAC/color value is missing from the table.

The probability of 4 random hash values generated in response to a 58-bit MAC/color value being the same, i.e., mapping to the same entry location within a table, is very small. Nevertheless, the hashing element 520 is configurable such that a different hash algorithm may be instituted in the event that similar 15-bit keys are produced. As a last resort, in event that such mapping overlap does occur during learning mode, one of the table entries is randomly replaced using, e.g., a random replacement algorithm or least recently used algorithm. If the overlap occurs, during a forwarding decision, the operation is considered a "miss" and an appropriate miss signal is issued to flood the data frame throughout the switch, as described below.

A comparison circuit arrangement is provided to validate the forwarding table entry mapped by the hashed MAC/color quantity. The comparison circuit 530 includes a comparator 532 coupled to the output of a first multiplexer 534 whose inputs are connected to the MAC/color fields of the table entries. The index fields of the tables are likewise fed to the inputs of a second multiplexer 536; the output of this latter "mux" is connected to one input of a third multiplexer 538. The other input of multiplexer 538 is provided with the color identifier of the current frame.

Operationally, the comparator 532 compares the MAC/color quantity from data frame 300 with the MAC/color value stored in field 514 of a selected mapped entry to ensure that the entry contains the correct index value. If the compared items match, the index value stored in the proper entry is selected by multiplexer 536 and provided to the input of multiplexer 538. This latter mux is enabled by the matched output signal of comparator 532 to provide the index over the result bus 475 and to the LTL 450. In response, the LTL translates the received index to a signal that selects a port or group of ports for receiving the data frame. If the MAC/color values do not match (i.e., a "miss"), the color identifier is selected by the multiplexer 538 and passed to the LTL 450 with the result that all ports having that color identifier receive the frame in accordance with a multicast transfer.

In addition to the main forwarding tables, separate status tables, collectively designated 550, are maintained by the mechanism 500 to keep track of the status of the main table entries 512. For each entry, 4 status bits, each contained in a respective status table, are preferably maintained: a valid (V) bit 552, a trap (T) bit 554, a static (S) bit 556 arid an aging (A) bit 558. The states of these latter two bits are provided to a control circuit 555, whereas the states of the V and T bits are provided to the inputs of selector circuits, collectively designated 552. The outputs of the selectors 552 are coupled to inputs of a logic (AND) gate 560; another input to gate 560 connects to the output of comparator 532. The output of gate 560 is a flood signal provided to the LTL 450.

Specifically, the valid bit 552 indicates whether a certain entry for a given table is valid, while the aging bit 554 identifies an entry which has not been accessed for a predetermined amount of time. During normal operation, each time an entry is accessed using the hashed SA/color key (during learning operations) the aging bit for that entry is set to a current value of an aging bit register (not shown). After waiting for the predetermined period of time defined by the current value, a processor (not shown) examines the forwarding table for any valid entries whose aging bill was not set to the current value of the aging bit register. Outdated entries are purged by resetting their valid bits.

The static bit 556 is preferably asserted for entries that should not be updated or removed from the forwarding tables, whereas the trap bit 558 is used to indicate an exception to the LTL 450. For example, whenever a frame's SA/color value is found in the forwarding table, a copy of that entry's trap bit is sent to the LTL along with the appropriate, index. This allows the LTL to behave differently for frames whose SA/color trap bits have been set in the table.

More specifically, the MSB of the address to the LTL store unit 600 is the trap bit 558; this bit is preferably examined in response to the source address of a frame. That is, the trap bit may be asserted in the forwarding table entry corresponding to the source address if security measures, such as "snooping", is specified for that particular source station. Since it is the MSB, the trap bit specifies either the upper or lower half segment of the LTL store unit 600.

The miss ("flood") signal is the next significant address bit and is used to specify either the upper or lower portion of the half segments. In response to a miss, the color value is used as the address to the "flood" address segment of the LTL 450. On the other hand, if the result of the comparison operation is a hit, the resulting index value from the table is provided over the result bus as the address into the "non-flood" address segment.

Figure 6:
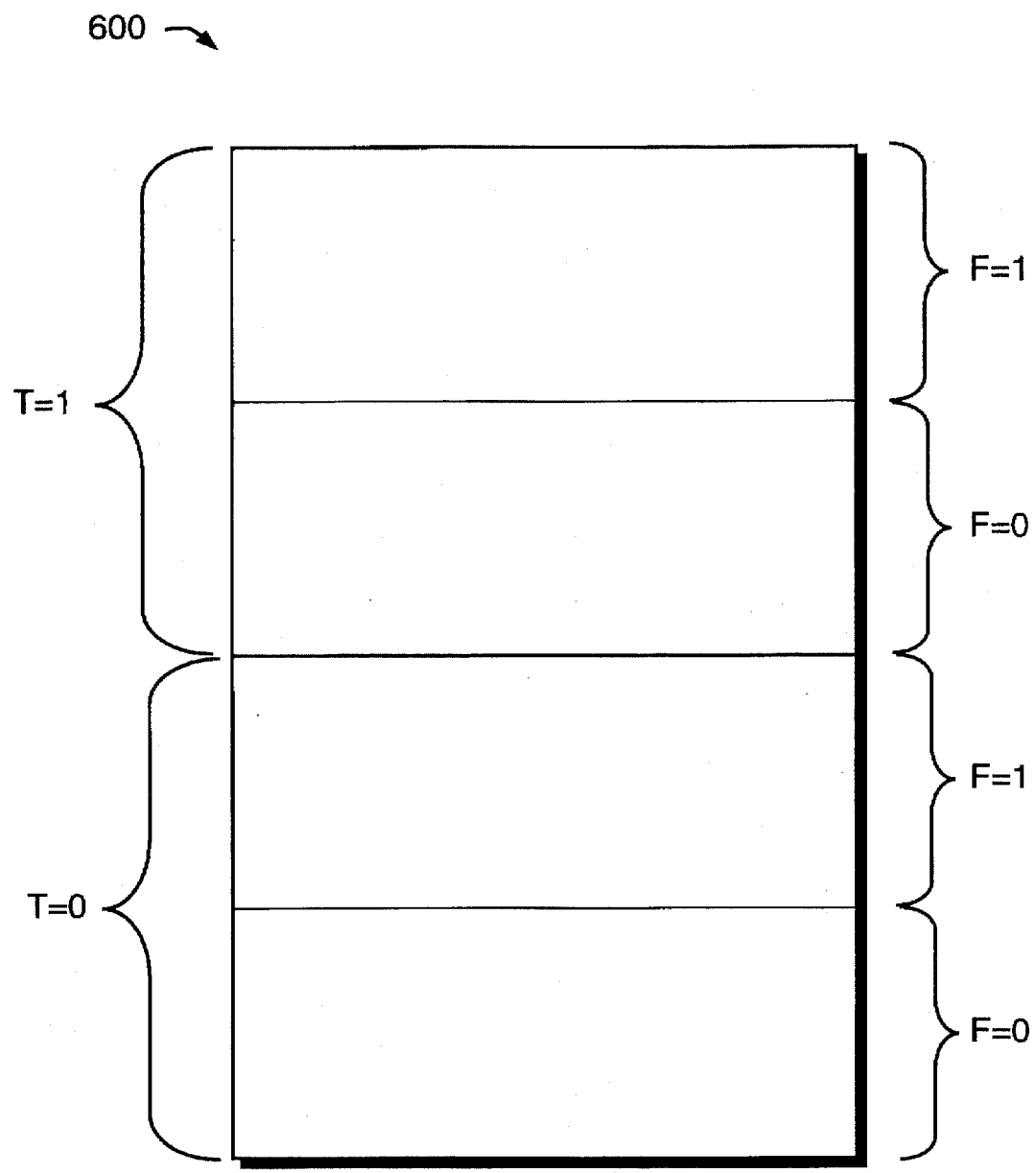
FIG. 6 is a schematic diagram illustrating the organization of a target logic circuit store unit used in connection with the mechanism of FIG. 5.

FIG. 6 is a schematic diagram illustrating the organization of the LTL store unit 600. As can be seen, the address space is effectively divided into half and quarter segments. The upper half segment is defined by the trap bit equal to 1 (T=1); this segment further includes quarter sections where the flood bit is set to 1 or 0 (F=1, F=0). Similarly, the lower half segment of the LTL is defined by the trap bit equal to 0 (T=0) and its quarters are also defined by the flood bit being set to 1 and 0 (F=1, F=0).

In accordance with the invention, the address translation mechanism 500 quickly and efficiently renders forwarding decisions for data frames transported among ports of a high-performance switch on the basis of VLAN associations and the unique index values of the ports. That is, use of the novel address translation mechanism allows entities of a first group to be associated with, e.g., VLAN 1 ports, while entities of a second group may be associated with VLAN 2 ports. Moreover, the binary-coded values stored in, e.g., location 656 of LTL store unit 600 translate to port select signal associated with VLAN floods. This translation mechanism provides an appearance (to a user) that all ports associated with VLAN 1 are on one switch and all ports associated with VLAN 2 are on a separate switch. This is referred to as "port-based" VLANs.

While there has been shown and described an illustrative embodiment for implementing an address translation mechanism that quickly and efficiently renders forwarding decisions for data frames transported among ports of a high-performance switch on the basis of VLAN and index associations among the ports, it is to be understood that various other adaptations and modifications may be made within the spirit and scope of the invention. For example, the novel address translation mechanism has the capability of conditional learning, i.e., if an entry exists in the forwarding table, it is not Updated; if the entry does not exist, it is inserted in to the table. This feature is primarily used to support asynchronous transfer mode (ATM) applications.

For such ATM applications, the forwarding table stores virtual circuit (VC) numbers rather than index values. Typically, ATM applications utilize LAN emulation mode; therefore, MAC addresses of data packets may be used over the switching bus for translation in connection with the novel mechanism. The ATM media may thus resemble a collection of LANs at the ports and the packet transferred over the switching bus is provided to a destination port of a particular ATM card specified by the VC number.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. An address translation mechanism for quickly rendering forwarding decisions for data frames transported among ports of a high-performance switch, the translation mechanism comprising:

a plurality of forwarding tables, each table containing entries having unique index values that translate to selection signals for ports destined to receive the data frames;

means for transforming a numerical quantity to a key value for accessing a selected table entry; and a comparison circuit arrangement for validating the contents of the selected table entry, the circuit arrangement comparing he numerical quantity with a similar value stored in the selected entry to ensure that the contents of the entry contain a correct unique index value.

2. The address translation mechanism of claim 1, wherein said means for transforming comprises means for hashing said numerical quantity to provide a signal value indicative of said key value, such that said key value maps into one location of each of said plurality of forwarding tables.

3. The address translation mechanism of claim 1, wherein each of said plurality of forwarding tables comprises means responsive to said key value for selecting one of said unique index values.

4. The address translation mechanism of claim 1, wherein each of said plurality of forwarding tables comprises a plurality of similar values each of which is uniquely associated with one of said unique index values stored in the table.

5. The address translation mechanism of claim 1, wherein said comparison circuit arrangement comprises means for providing a comparison status signal value which is asserted when said similar value is equal to said numerical quantity.

6. The address translation mechanism of claim 5, further comprising means for monitoring the validity of table entries within said plurality of forwarding tables, and for providing a table status signal value indicative thereof;

means for comparing said table status signal value and said comparison status signal value, and for outputting said similar value when said table status signal and said comparison status signal values are asserted.

7. The address translation mechanism of claim 6, further comprising means for translating said unique associated index signal value to a selection signal value indicative of which ports receive the data frames.

8. The address translation mechanism of claim 6, further comprising means for receiving a data frame; and means, for parsing said received data flame to determine a destination address value and color value indicative of the ports to receive and retain said received data frame, and for providing said numerical quantity which is indicative of said destination address and said color value of said received data frame.

9. Apparatus for quickly and efficiently rendering forwarding decisions for a data frame transferred among ports of a network switch via a bus, the data frame containing a media access control (MAC) address of a network entity destined to receive the frame and a color identifier representing a virtual local area network association of the port transferring the frame over the bus, the apparatus comprising:

a bus interface circuit for parsing the data frame to extract the MAC address and color identifer;

means, responsive to the extracted MAC address and color identifier, for producing an index value; and a target logic circuit coupled to the producing means, the target logic circuit translating the index value to a coded signal that selects one of a port and group of ports for receiving the data frame.

10. The apparatus of claim 9 wherein the producing means comprises:

a forwarding table containing an entry for storing the index value and a MAC/color value; and a hashing element coupled to the forwarding table, the hashing element generating a key in response to the extracted MAC address and color identifier, the key mapping to the entry of the forwarding table.

11. The apparatus of claim 10 wherein the producing means further comprises means, coupled to the forwarding table, for ensuring that the entry contains a correct index value.

12. The apparatus of claim 11 wherein the ensuring leans comprises:

a first multiplexer having an input coupled to the forwarding table and an output, the first multiplexer enabled by a translation controller to select the MAC/color value of the entry; and a comparator having an input coupled to the output of the first multiplexer, the comparator performing a comparison operation between (i) the extracted destination address and color identifier and (ii) the selected MAC/color value to generate a comparison signal.

13. The apparatus of claim 12 wherein the ensuring means further comprises:

a second multiplexer having an input coupled to the forwarding table and an output, the second multiplexer enabled by the translation controller to select the index value of the entry; and a third multiplexer having one input coupled to the output of the second multiplexer and another input receiving the extracted color identifier, the third mutiplexer enabled by the comparison signal to select one of the index value and extracted color identifier depending upon a state of the comparison signal.

14. The apparatus of claim 9 wherein the target logic circuit comprises:

a store unit having a plurality of locations each containing a bit string that functions as a port mask, wherein each bit of the port mask corresponds to a specific port of the switch and wherein the coded signal is derived from the port mask; and a controller coupled to the store unit, the controller mapping the index value to a location of the store unit to generate the coded signal.

15. A method for quickly and efficiently rendering forwarding decisions for a data frame transferred among ports of a network switch in accordance with a bus transaction over a switching bus, the method comprising the steps of:

A. parsing the data frame at a forwarding engine to extract a media access control (MAC) address and color identifer value from the frame, the MAC address specifying the destination address of a network entity receiving the frame and the color identifier value representing a virtual local area network association of the port transferring the frame through the switch;

B. producing an index value in response to the extracted MAC address and color identifier at a translation circuit of the engine; and C. translating the index value to a coded signal at a target logic circuit, the coded signal selecting one of a port and group of ports for receiving the frame.

16. The method of claim 15 wherein step B comprises the steps of:

B1. storing the index value and a MAC/color value in one of a plurality of entries of a forwarding table of the engine; and B2. generating a key in response to the extracted MAC address and color identifier using a hashing element of the engine.

17. The method of claim 16 wherein step B further comprises the step of:

B3. mapping the key mapping to the one entry of the forwarding table.

18. The method of claim 17 wherein step B still further comprises the steps of:

B4. comparing the extracted destination address and color identifier with the MAC/color value of the one entry; and B5. generating a comparison signal in response to the comparing step to ensure that the one entry contains a correct index value.

19. The method of claim 15 wherein step C comprises the steps of:

C1. storing a bit string in one of a plurality of locations of a target logic store unit, each bit of the string corresponding to a specific port of the switch; and C2. mapping the index value to the one location of the target logic store unit to derive the coded signal.

20. The method of claim 15 further comprising the step of:

D. transferring the frame over the bus in accordance with a current bus transaction contemporaneous with the performance of steps A–C.

* * * * *

UNITED STATES PATENT AND TRADEMARK OFFICE
CERTIFICATE OF CORRECTION

PATENT NO. : 5,740,171
DATED : April 14, 1998
INVENTOR(S) : Mario Mazzola, et al.

It is certified that error appears in the above-identified patent and that said Letters Patent is hereby corrected as shown below:

Title page, item

"[73] Assignee:" field, change "Cisco Systems, Inc." to --Cisco Technology, Inc."

Column 1, line 9, change "(112025-0013)" to --08/621,720--;
Column 1, line 12, change "(112025-0015)" to --08/623,142--;
Column 1, line 16, change "(112025-0016)" to --08/620,788--.

Signed and Sealed this

Twenty-fourth Day of August, 1999

Attest:

Q. TODD DICKINSON

*Attesting Officer*    *Acting Commissioner of Patents and Trademarks*